United States Patent
Dimitrakopoulos et al.

(10) Patent No.: US 11,203,864 B2
(45) Date of Patent: Dec. 21, 2021

(54) PLASTER BOARDS AND METHODS FOR MAKING THEM

(71) Applicant: CertainTeed Gypsum, Inc., Malvern, PA (US)

(72) Inventors: James Dimitrakopoulos, Conshohocken, PA (US); Gregory F. Jacobs, Oreland, PA (US)

(73) Assignee: CertainTeed Gypsum, Inc., Malvern, PA (US)

(*) Notice: Subject to any disclaimer, the term of this patent is extended or adjusted under 35 U.S.C. 154(b) by 242 days.

(21) Appl. No.: 16/147,013

(22) Filed: Sep. 28, 2018

(65) Prior Publication Data

US 2019/0093343 A1 Mar. 28, 2019

Related U.S. Application Data

(60) Provisional application No. 62/565,003, filed on Sep. 28, 2017.

(51) Int. Cl.
*B32B 7/02* (2019.01)
*E04B 1/86* (2006.01)
(Continued)

(52) U.S. Cl.
CPC .................. *E04B 1/86* (2013.01); *B32B 7/14* (2013.01); *B32B 13/12* (2013.01); *B32B 37/12* (2013.01);
(Continued)

(58) Field of Classification Search
CPC ......... B32B 13/00; B32B 13/04; B32B 13/12; E04B 1/86; E04C 2/043; E04C 2/2885
See application file for complete search history.

(56) References Cited

U.S. PATENT DOCUMENTS 1,798,609 A 3/1931 Knowlton
2,811,906 A 11/1957 Chappell
(Continued)

FOREIGN PATENT DOCUMENTS

AU 2007100101 B4 3/2007
CN 203145224 U 8/2013
(Continued)

OTHER PUBLICATIONS

International Search Report issued in co-pending International Patent Application No. PCT/US2018/053563, ISA/KR, Korean Patent Office, dated Jan. 30, 2019, 4 pages.
(Continued)

*Primary Examiner* — Zachary M Davis
(74) *Attorney, Agent, or Firm* — McDonnell Boehnen Hulbert & Berghoff LLP (57) ABSTRACT

One aspect of the disclosure is a plaster board having a first edge and an opposed second edge, and a third edge and an opposed fourth edge. The plaster board includes a first layer of hardened plaster material including a first surface and an opposed second surface, and a second layer of hardened plaster material including a first surface and an opposed second surface. The second layer of hardened plaster material is stacked against the first layer such that their first surfaces face one another. The first layer and the second layer together define the first, second, third, and fourth edges of the plaster board. The plaster board also includes a viscoelastic polymer disposed between the first surfaces of the first and second layers of hardened plaster material. The viscoelastic polymer does not extend substantially to the first, second, third, and fourth edges of the plaster board.

10 Claims, 5 Drawing Sheets

(51) Int. Cl.
*E04C 2/288* (2006.01)
*B32B 7/14* (2006.01)
*B32B 13/12* (2006.01)
*B32B 37/12* (2006.01)
*E04C 2/04* (2006.01)
*E04B 1/84* (2006.01)

(52) U.S. Cl.
CPC ............ *E04C 2/043* (2013.01); *E04C 2/2885* (2013.01); *B32B 2307/102* (2013.01); *B32B 2307/51* (2013.01); *B32B 2607/00* (2013.01); *E04B 2001/8461* (2013.01)

(56) References Cited

U.S. PATENT DOCUMENTS

| | | |
|---|---|---|
| 3,047,447 A | 7/1962 | Stasse |
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball, III et al. |
| 3,424,270 A | 1/1969 | Hartman et al. |
| 3,462,899 A | 8/1969 | Sherman |
| 3,513,009 A | 5/1970 | Austin et al. |
| 3,579,941 A | 5/1971 | Tibbals |
| 3,642,511 A | 2/1972 | Cohn et al. |
| 3,828,504 A * | 8/1974 | Egerborg ................. E04C 3/36 52/403.1 |
| 3,944,698 A | 3/1976 | Dierks et al. |
| 3,960,580 A | 6/1976 | Stierli et al. |
| 4,003,752 A | 1/1977 | Osohata et al. |
| RE29,157 E | 3/1977 | Petersen et al. |
| 4,112,176 A | 9/1978 | Bailey |
| 4,134,956 A | 1/1979 | Suzuki et al. |
| 4,156,615 A | 5/1979 | Cukier et al. |
| 4,174,229 A | 11/1979 | Boberski et al. |
| 4,347,912 A | 9/1982 | Flocke et al. |
| 4,375,516 A | 3/1983 | Barrail |
| 4,474,840 A | 10/1984 | Adams |
| 4,487,793 A | 12/1984 | Haines et al. |
| 4,557,970 A | 12/1985 | Holtrop et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |
| 4,759,164 A | 7/1988 | Abendroth et al. |
| 4,778,028 A | 10/1988 | Staley |
| 4,786,543 A | 11/1988 | Ferm |
| 4,858,402 A | 8/1989 | Putz |
| 4,924,969 A | 5/1990 | K'Heureux |
| 4,956,321 A | 9/1990 | Barrall |
| 4,967,530 A | 11/1990 | Clunn |
| 5,016,413 A | 5/1991 | Counihan |
| 5,026,593 A | 6/1991 | O'Brien |
| 5,033,247 A | 7/1991 | Clunn |
| 5,063,098 A | 11/1991 | Niwa et al. |
| 5,085,929 A | 2/1992 | Bruce |
| 5,110,660 A | 5/1992 | Wolf et al. |
| 5,116,671 A | 5/1992 | Bruce |
| 5,125,475 A | 6/1992 | Ducharme et al. |
| 5,158,612 A | 10/1992 | Savoly et al. |
| 5,240,639 A | 8/1993 | Diez et al. |
| 5,256,223 A | 10/1993 | Alberts et al. |
| 5,258,585 A | 11/1993 | Juriga |
| 5,334,806 A | 8/1994 | Avery |
| 5,342,465 A | 8/1994 | Bronowicki et al. |
| 5,368,914 A | 11/1994 | Barrett |
| 5,439,735 A | 8/1995 | Jamison |
| 5,473,122 A | 12/1995 | Kodiyalam et al. |
| 5,502,931 A | 4/1996 | Munir |
| 5,601,888 A | 2/1997 | Fowler |
| 5,603,192 A | 2/1997 | Dickson |
| 5,629,503 A | 5/1997 | Thomasen |
| 5,643,666 A | 7/1997 | Eckart et al. |
| 5,664,397 A | 9/1997 | Holz |
| 5,691,037 A | 11/1997 | McCutcheon et al. |
| 5,695,867 A | 12/1997 | Saitoh et al. |
| 5,768,841 A | 6/1998 | Swartz et al. |
| 5,824,973 A | 10/1998 | Haines et al. |
| 5,842,686 A | 12/1998 | Hansen |
| 5,867,957 A | 2/1999 | Holtrop |
| 5,910,082 A | 6/1999 | Bender et al. |
| 5,945,208 A | 8/1999 | Richards et al. |
| 5,954,497 A | 9/1999 | Cloud et al. |
| 6,077,613 A | 6/2000 | Gaffigan |
| 6,115,926 A | 9/2000 | Robell |
| 6,123,171 A | 9/2000 | McNett et al. |
| 6,133,172 A | 10/2000 | Sevenish et al. |
| 6,213,252 B1 | 4/2001 | Ducharme |
| 6,240,704 B1 | 6/2001 | Porter |
| 6,266,427 B1 | 7/2001 | Mathur |
| 6,286,280 B1 | 9/2001 | Fahmy et al. |
| 6,290,021 B1 | 9/2001 | Standgaard |
| 6,309,985 B1 | 10/2001 | Virnelson et al. |
| 6,319,312 B1 | 11/2001 | Luongo |
| 6,342,284 B1 | 1/2002 | Yu |
| 6,381,196 B1 | 4/2002 | Hein et al. |
| 6,387,172 B1 | 5/2002 | Yu |
| 6,389,771 B1 | 5/2002 | Moller |
| 6,391,958 B1 | 5/2002 | Luongo |
| 6,443,256 B1 | 9/2002 | Baig |
| 6,539,643 B1 | 4/2003 | Gleeson |
| 6,562,444 B1 | 5/2003 | Gleeson |
| 6,632,550 B1 | 10/2003 | Yu |
| 6,676,744 B2 | 1/2004 | Merkley et al. |
| 6,699,426 B1 | 3/2004 | Burke |
| 6,715,241 B2 | 4/2004 | Gelin et al. |
| 6,758,305 B2 | 7/2004 | Gelin et al. |
| 6,760,978 B2 | 7/2004 | Gleeson |
| 6,790,520 B1 | 9/2004 | Todd et al. |
| 6,800,161 B2 | 10/2004 | Takigawa |
| 6,803,110 B2 | 10/2004 | Drees et al. |
| 6,815,049 B2 | 11/2004 | Veramasuneni |
| 6,822,033 B2 | 11/2004 | Yu |
| 6,825,137 B2 | 11/2004 | Fu et al. |
| 6,877,585 B2 | 4/2005 | Tinianov |
| 6,913,667 B2 | 7/2005 | Nudo et al. |
| 6,920,723 B2 | 7/2005 | Downey |
| 6,941,720 B2 | 9/2005 | Deford et al. |
| 7,041,377 B2 | 5/2006 | Miura et al. |
| 7,068,033 B2 | 6/2006 | Sellers et al. |
| 7,181,891 B2 | 2/2007 | Surace et al. |
| 7,197,855 B2 | 4/2007 | Della Pepa |
| 7,255,907 B2 | 8/2007 | Feigin et al. |
| 7,745,005 B2 | 6/2010 | Tinianov |
| 7,799,410 B2 | 9/2010 | Tinianov |
| 7,883,763 B2 | 2/2011 | Tinianov |
| 8,424,251 B2 | 4/2013 | Tinianov |
| 9,388,568 B2 | 7/2016 | Tinianov |
| 9,390,700 B1 | 7/2016 | Pham |
| 10,174,499 B1 | 1/2019 | Tinianov |
| 2001/0044016 A1 * | 11/2001 | Watras ................... B32B 29/00 428/292.1 |
| 2004/0016184 A1 | 1/2004 | Huebsch |
| 2004/0168853 A1 | 9/2004 | Gunasekera |
| 2004/0214008 A1 | 10/2004 | Dobrusky |
| 2004/0224584 A1 | 11/2004 | Broadway |
| 2005/0103568 A1 | 5/2005 | Sapoval |
| 2005/0130541 A1 | 6/2005 | Shah |
| 2005/0263925 A1 | 12/2005 | Heseltine |
| 2005/0266225 A1 | 12/2005 | Currier |
| 2006/0045975 A1 | 3/2006 | Yamaji |
| 2006/0048682 A1 | 3/2006 | Wagh |
| 2006/0057345 A1 | 3/2006 | Surace |
| 2006/0059806 A1 | 3/2006 | Gosling |
| 2006/0108175 A1 | 5/2006 | Surace |
| 2006/0117574 A1 | 6/2006 | Martin |
| 2007/0023118 A1 | 2/2007 | Spielvogel |
| 2007/0094950 A1 | 5/2007 | Surace |
| 2007/0102237 A1 | 5/2007 | Baig |
| 2007/0107350 A1 | 5/2007 | Surace |
| 2007/0220824 A1 | 9/2007 | Hasegawa |
| 2008/0050562 A1 | 2/2008 | Braun |

(56) References Cited

U.S. PATENT DOCUMENTS

| | | |
|---|---|---|
| 2008/0086957 A1 | 4/2008 | Averill |
| 2008/0245603 A1 | 10/2008 | Tinianov |
| 2008/0251198 A1 | 10/2008 | Tinianov |
| 2008/0261041 A1 | 10/2008 | Thomas |
| 2008/0264721 A1 | 10/2008 | Tinianov |
| 2009/0004448 A1 | 1/2009 | Tinianov |
| 2009/0022962 A1 | 1/2009 | Ruokolainen |
| 2009/0280356 A1 | 11/2009 | Tinianov |
| 2010/0018133 A1 | 1/2010 | Boyadjian |
| 2010/0048372 A1 | 2/2010 | Okazaki |
| 2010/0230206 A1 | 9/2010 | Tinianov |
| 2010/0255243 A1 | 10/2010 | Geeraert |
| 2011/0061324 A1 | 3/2011 | Tinianov |
| 2011/0165429 A1 | 7/2011 | Tinianov |
| 2011/0296794 A1 | 12/2011 | Thomas |
| 2012/0090183 A1 | 4/2012 | Cadden |
| 2012/0295059 A1 | 11/2012 | Frank |
| 2013/0118831 A1 | 5/2013 | Kawai |
| 2013/0186705 A1 | 7/2013 | Payot |
| 2013/0240291 A1 | 9/2013 | Tinianov |
| 2014/0329060 A1 | 11/2014 | Vivier |
| 2015/0218804 A1 | 8/2015 | Payot |
| 2016/0146349 A1* | 5/2016 | Le Lay ............... B64C 1/18 428/41.7 |
| 2016/0153187 A1 | 6/2016 | Desai |
| 2016/0230384 A1 | 8/2016 | Blades |
| 2017/0037617 A1 | 2/2017 | Blades |
| 2017/0037637 A1 | 2/2017 | Grisolla |
| 2017/0081843 A1 | 3/2017 | Berenth |
| 2017/0144324 A1 | 5/2017 | Thibault |
| 2017/0225426 A1 | 8/2017 | Glean et al. |
| 2018/0030741 A1 | 2/2018 | Cruickshank |
| 2018/0171626 A1 | 6/2018 | Shi |
| 2019/0093354 A1 | 3/2019 | Dmitrakopoulos |

FOREIGN PATENT DOCUMENTS

| | | |
|---|---|---|
| CN | 103291035 A | 9/2013 |
| CN | 10647637 A | 3/2017 |
| JP | H09203153 A | 8/1997 |
| KR | 10-2014-0113068 A | 9/2014 |
| KR | 20140113068 A | 9/2014 |
| WO | 9001090 A1 | 2/1990 |
| WO | 1996034261 A1 | 10/1996 |
| WO | 1997019033 A1 | 5/1997 |
| WO | 2000024690 A1 | 5/2000 |
| WO | 2017108146 A1 | 6/2017 |

OTHER PUBLICATIONS

Written Opinion issued in co-pending International Patent Application No. PCT/US2018/053563, ISA/KR, Korean Patent Office, dated Jan. 30, 2019, 7 pages.

Copending U.S. Appl. No. 16/143,084, filed Sep. 26, 2018.

Copending U.S. Appl. No. 15/844,088, filed Dec. 15, 2017.

Lippiatt, B.C., National Institute of Standards and Technology. BEES 3.0, "Building for Environmental and Economic Sustainability Technical Manual and User Guide", Oct. 2002, (198 pages).

CertainTeed, "QuietRock 510 Installation Instructions", Jul. 2010, (date accessed Aug. 13, 2014), https://www.certainteed.com/resources/CTG_2823_QR510_Installation_E.pdf.

Noise Killer: Pro Damping Compound Materials http://www.tnt-audio.com/clinica/noise.html May 18, 2007, 1998 (3 pages).

Nsharp, B.H. "A Study of Techniques to Increase the Sound Insulation of Building Elements" Prepared for the Department of Housing and Urban Development, Washington, D.C. Jun. 1973.

Patent Examination Report No. 1 dated Apr. 24, 2013, from Australian Application No. 2008237205, 5 pages.

Marty, R. "Data support use of P-Cell in diabetic footwear", CMP Media LLC, Mar. 1, 2003.

Ostegaard, P.B. et al."Transmission Loss of Leaded Building Materials," The Journal of the Acoustical Society of America, vol. 35, No. 6, Jun. 1963.

Unified Facilities Criteria (UFC) Noise and Vibration Control, UFC 3-450-01. May 15, 2003, Department of Defense.

Wood Handbook/Wood as an Engineering Material, United States Department of Agriculture, Forest Service, General Technical Report FPL-FGTR-113, Mar. 1999.

ASC WallDamp materials from Acoustic Sciences Corporation http://web.archive.org/web/20021013031149/www.asc-soundproof.com:80/index-walldamp . . . (accessed May 3, 2021) 11 pages.

ADM Technologies, USA, Dynamic Control http://web.archive.org/web/20010518083911/www.admteschusa.com . . . (accessed May 3, 2021) 21 pages.

Nordisk Akustik A/S materials, LDL for sandwhich-construktions, http://web.archive.org/web/200206240933724/www.nordisk-akustik.dk/html_uk/prod03.html (accessed May 3, 2021) 2 pages.

Noxon, A.M. "The Chain is as Strong as Its Weakest Link" Acoustic Sciences Corporation, http://www.art-noxon.com/articles/chain.htm (accessed May 3, 2021). 8 pages.

* cited by examiner

FIG. 8 ics, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound-damping plaster boards that can be used in place of conventional plaster boards in various residential or commercial structures.

PLASTER BOARDS AND METHODS FOR MAKING THEM

CROSS-REFERENCE TO RELATED APPLICATIONS

This application claims the benefit of priority of U.S. Provisional Patent Application No. 62/565,003, filed Sep. 28, 2017, which is hereby incorporated herein by reference in its entirety.

BACKGROUND OF THE DISCLOSURE

1. Field of the Disclosure

The present disclosure relates generally to plaster boards and methods for making plaster boards. The present disclosure relates more particularly to plaster boards having a viscoelastic polymer disposed between two layers of hardened plaster material such that the viscoelastic polymer does not extend substantially to at least one lateral edge of the plaster board.

2. Technical Background

Plaster boards, also known as "drywall boards," are typically used to construct walls within homes, businesses, or other buildings. Plaster boards are very often made of gypsum, but other materials, including lime and cement, are also used. A typical method for making a plaster board involves dispensing and spreading a wet plaster material (e.g., a slurry of gypsum in water) onto a paper or fiberglass liner on a platform, and covering the plaster material with another paper or fiberglass liner. This sandwiched structure is fed through extruder plates to provide a structure of a desired thickness and allowed to cure to form a hardened plaster material disposed between the two liners of paper or fiberglass. The plaster board may be cut into sections having predetermined lengths and widths that conform to accepted construction standards.

Soundproofing is becoming an ever-increasing concern for the construction industry, for example, for use in residences, hotels, schools, and hospitals. Soundproofing is also desirable in the construction of theaters and music studios, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound-damping plaster boards that can be used in place of conventional plaster boards in various residential or commercial structures.

A sound-damping plaster board typically includes a damping layer having viscoelastic properties disposed between first and second layers of hardened plaster material. In some cases, the damping layer may be disposed between respective paper or fiberglass liners adhered to the first and second layers of hardened plaster material. The damping layer is typically more efficient at sound damping than the layers of hardened plaster material on either side of the damping layer.

Some sound-damping plaster boards may exhibit delamination due to ambient conditions such as temperature and humidity and/or tradeoffs that may exist between the sound-damping qualities and the adhesive strength of the viscoelastic polymer that holds the layers of hardened plaster material together.

Accordingly, what are needed are improved processes for making laminated plaster sound-damping plaster boards, and sound-damping plaster boards amenable for production by such processes with better product quality.

SUMMARY OF THE DISCLOSURE

One aspect of the disclosure is a plaster board having a first edge and an opposed second edge, and a third edge and an opposed fourth edge, the plaster board comprising:
a first layer of hardened plaster material comprising a first surface and an opposed second surface;
a second layer of hardened plaster material comprising a first surface and an opposed second surface, the second layer of hardened plaster material being stacked against the first layer such that their first surfaces face one another, the first layer and the second layer together defining the first, second, third, and fourth edges of the plaster board; and
a viscoelastic polymer disposed between the first surface of the first layer of hardened plaster material and the first surface of the second layer of hardened plaster material, the viscoelastic polymer not extending substantially to the first, second, third, and fourth edges of the plaster board.

In certain embodiments, the plaster board further includes adhesive tape disposed along one or more of the first, second, third, and fourth edges of the plaster board, the adhesive tape binding the second surface of the second layer of hardened plaster material to the second surface of the first layer of hardened plaster material such that the adhesive tape holds the first layer of hardened plaster in place with respect to the second layer of hardened plaster material.

In certain embodiments, the plaster board further includes a structural adhesive material disposed between the first surface of the first layer of hardened plaster material and the first surface of the second layer of hardened plaster material, along one or more of the first, second, third, and fourth edges of the plaster board, laterally between the viscoelastic polymer and the one or more of the first, second, third, and fourth edges, the structural adhesive material being a substantially less viscoelastic material than the viscoelastic polymer.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted disadvantages of sound damping plaster boards formed using existing processes. Conventional sound-damping plaster boards are generally formed by adhering two layers of hardened plaster material to each other with a viscoelastic polymer that serves as both a sound damping layer and an adhesive material. The viscoelastic polymer might have improved sound damping qualities when compared to other adhesive materials, but the viscoelastic polymer might not have the adhesive strength of the other adhesive materials. Due to this tradeoff, the sound damping plaster board may delaminate (e.g., come apart) in some cases, especially at the edges of the board. The sound damping plaster board described below may exhibit sound damping characteristics comparable to conventional sound damping plaster boards as well as improved adhesion between the layers of hardened plaster material at the edges of the board.

Accordingly, one aspect of the disclosure is a plaster board having a first edge and an opposed second edge, and a third edge and an opposed fourth edge. The plaster board includes a first layer of hardened plaster material that includes a first surface and an opposed second surface, and a second layer of hardened plaster material that includes a first surface and an opposed second surface. The second layer of hardened plaster material is stacked against the first layer such that their first surfaces face one another. The first layer and the second layer together define the first, second, third, and fourth edges of the plaster board. The plaster board further includes a viscoelastic polymer disposed between the first surface of the first layer of hardened plaster material and the first surface of the second layer of hardened plaster material. The viscoelastic polymer does not extend substantially to the first, second, third, and fourth edges of the plaster board. That is, the viscoelastic polymer may be applied to the board such that the viscoelastic polymer leaves a gap between the two layers of hardened plaster materials at one or more edges of the plaster board.

The plaster board may also include a structural adhesive material (e.g., a cyanoacrylate or a rigid epoxy) that is substantially less viscoelastic than the viscoelastic polymer. The structural adhesive material may be disposed between the first surface of the first layer of hardened plaster material and the first surface of the second layer of hardened plaster material, along one or more of the first, second, third, and fourth edges of the plaster board. For example, the structural adhesive material may be disposed laterally between the viscoelastic polymer and the one or more of the first, second, third, and fourth edges. The improved strength of the structural adhesive material may help prevent delamination of the sound damping plaster board, while the viscoelastic polymer that is disposed throughout the remaining interior of the board may yield sound damping characteristics that are very similar to and/or negligibly different from conventional sound damping plaster boards. In certain desirable embodiments, the structural adhesive is a substantially stronger adhesive than the viscoelastic polymer. As used herein, "substantially stronger adhesive" means that the material is an observably or quantifiably stronger adhesive for the materials of the plaster board that it bonds.

In some embodiments, adhesive tape is disposed along one or more of the first, second, third, and fourth edges of the plaster board. The adhesive tape binds the second surface of the second layer of hardened plaster material to the second surface of the first layer of hardened plaster material such that the adhesive tape applies a force that presses the first layer of hardened plaster material toward the second layer of hardened plaster material.

The general construction of the plaster boards described herein, e.g., with a first layer of hardened plaster material and a second layer of hardened plaster material with a viscoelastic polymer disposed between, can result in a visible seam between the layers. Use of an adhesive tape as described herein can help to provide the edge of the board with the appearance of one continuous layer (i.e., as opposed to two conjoined boards), as well as to give the edge of the board a smoother or "flatter" finish (i.e., as opposed to two different edge geometries).

The viscoelastic polymer (e.g., the damping compound marketed as "GREEN GLUE," a registered trademark of the Saint-Gobain Performance Plastics Corporation) may include any material that helps decouple vibrations on one side of the plaster board from the other side of the plaster board. In certain embodiments, the viscoelastic polymer can have, for example, a damping loss factor greater than 1%, e.g., greater than 2%, or greater than 3%, or greater than 5%, or greater than 10%, for example, in the range of 1%-50%, or 2%-50%, or 3%-50%, or 5%-50%, or 10%-50%, or 1%-40%, or 2%-40%, or 3%-40%, or 5%-40%, or 10%-40%, or 1%-30%, or 2%-30%, or 3%-30%, or 5%-30%, or 10%-30%. This can be compared with the much lower value, lower than 1% for typical plaster materials such as gypsum. As referred to herein, and as would be appreciated by the person of ordinary skill in the art, a "damping loss factor" is a dimensionless metric of how efficient a material is at dissipating mechanical vibrations (e.g., sound waves) as heat. In a laminated gypsum board, as in other laminated structures, the working mechanism for noise and vibration control is known as constrained layer damping (CLD). Energy dissipation in laminated gypsum board is achieved by shearing the viscoelastic polymer between two layers of gypsum. The energy dissipation provided by the interlayer is quantified by the loss factor (q), a dimensionless quantity that can be measured directly or predicted from the modal damping of a dynamic system based on the RKU algorithm. Several standards are available for measuring the damping of a laminated structure (e.g., SAE J1737 or ISP 16940-2009); however, as used herein, ASTM E75-05 is used to measure the damping loss factor. Damping loss factor is further described in Crane, R. and Gillespie, J., "A Robust Testing Method for Determination of the Damping Loss Factor of Composites," Journal of Composites, Technology and Research, Vol. 14, No. 2, 1992, pp. 70-79; Kerwin et al., "Damping of Flexural Vibrations by means of Constrained Viscoelastic Laminate," Journal of Acoustic Society of America, 1959, pp. 952-962; and Ross, D. et al., "Damping of Flexural Vibrations by Means of Viscoelastic laminate", in Structural Damping, ASME, N.Y., 1959.

In various particular embodiments, the viscoelastic polymer is in the form of a glue, a resin, or an epoxy, for example. Desirably, the viscoelastic polymer exhibits large stress/strain delay or phase difference under loading. These materials can be characterized by Dynamic-Mechanical Analysis (DMA), a technique commonly used to measure the mechanical and damping properties of polymer materials. The shear modulus (also known as the modulus of rigidity) is defined as the ratio of shear stress to shear strain; in certain particular embodiments as otherwise described herein, the viscoelastic polymer has a shear modulus in the range of 10 kPa to 100 MPa, e.g., 10 kPa-50 MPa, or 10 kPa-10 MPa, or 10 kPa-1 MPa, or 50 kPa to 100 MPa, or 50 kPa-50 MPa, or 50 kPa-10 MPa, or 50 kPa-1 MPa, or 100 kPa to 100 MPa, or 100 kPa-50 MPa, or 100 kPa-10 MPa, or 100 kPa-1 MPa. This can be compared to the elastic modulus of plaster materials (e.g., ~2 GPa for gypsum).

In certain desirable embodiments of the plaster boards and methods as described herein, the viscoelastic polymer is substantially less rigid than the hardened plaster material. For example, in certain embodiments, the viscoelastic polymer is at least 20% less, or even at least about 40% less rigid or stiff than the body of hardened plaster material. There are a variety of tests of rigidity (e.g., SAE J1737 and ISP 16940-2009), but as used herein, rigidity is measured via ASTM E75-05. In other embodiments, the plaster board is substantially less rigid (e.g., at least 20% less rigid or at least 40% less rigid) than an otherwise identical plaster board lacking the viscoelastic polymer.

And as described above, in certain desirable embodiments of the plaster boards and methods as described herein, the structural adhesive is substantially more rigid than the viscoelastic material. For example, in certain embodiments, the viscoelastic polymer is at least 20% less, or even at least about 40% less rigid or stiff than the structural adhesive. There are a variety of tests of rigidity (e.g., SAE J1737 and ISP 16940-2009), but as used herein, rigidity is measured via ASTM E75-05.

In certain desirable embodiments, the structural adhesive exhibits much less stress/strain delay or phase difference under loading than does the viscoelastic polymer. These materials can be characterized by Dynamic-Mechanical Analysis (DMA), a technique commonly used to measure the mechanical and damping properties of polymer materials. The shear modulus (also known as the modulus of rigidity) is defined as the ratio of shear stress to shear strain; in certain particular embodiments as otherwise described herein, the structural adhesive has a shear modulus that is at least 10 MPa, at least 50 MPa, or even at least 100 MPa greater than the shear modulus of the viscoelastic polymer. In certain such embodiments, the structural adhesive has a shear modulus of at least 10 MPa, at least 100 MPa, or even at least 500 MPa.

Figure 1:
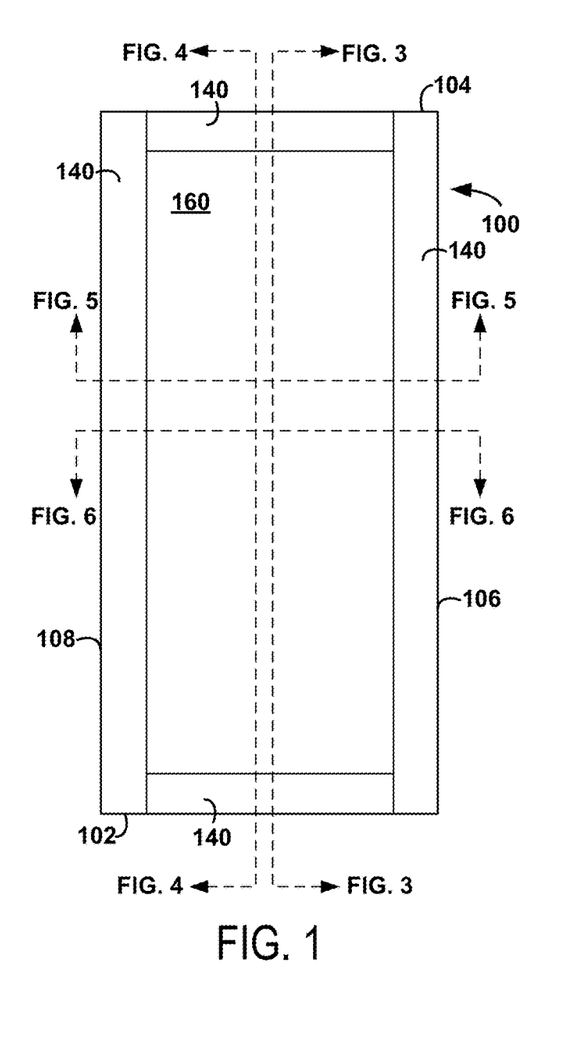
FIG. 1 is a schematic top view of a plaster board according to one embodiment of the disclosure.
Figure 2:
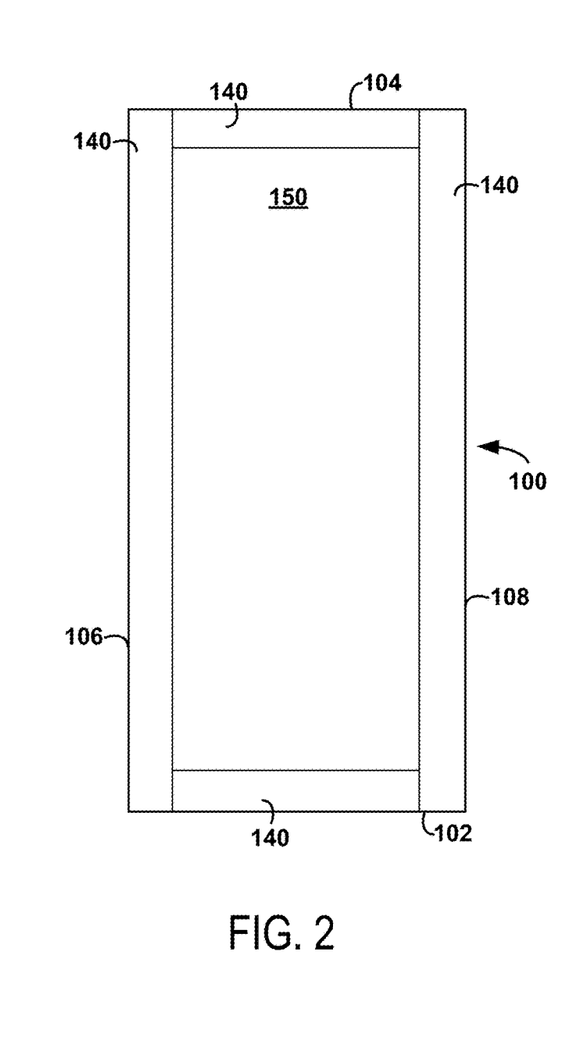
FIG. 2 is a schematic bottom view of a plaster board according to another embodiment of the disclosure.
Figure 3:
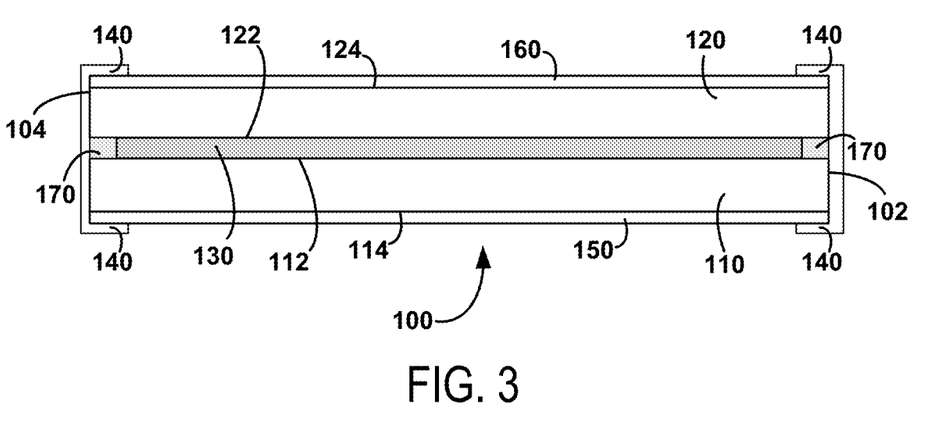
FIG. 3 is a schematic cross-section view of a plaster board according to another embodiment of the disclosure.
Figure 4:
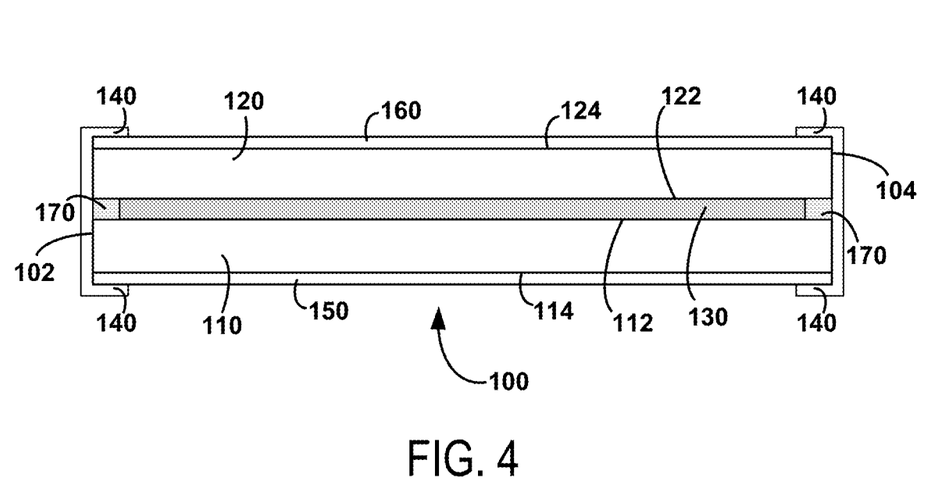
FIG. 4 is a schematic cross-section view of a plaster board according to another embodiment of the disclosure.
Figure 5:
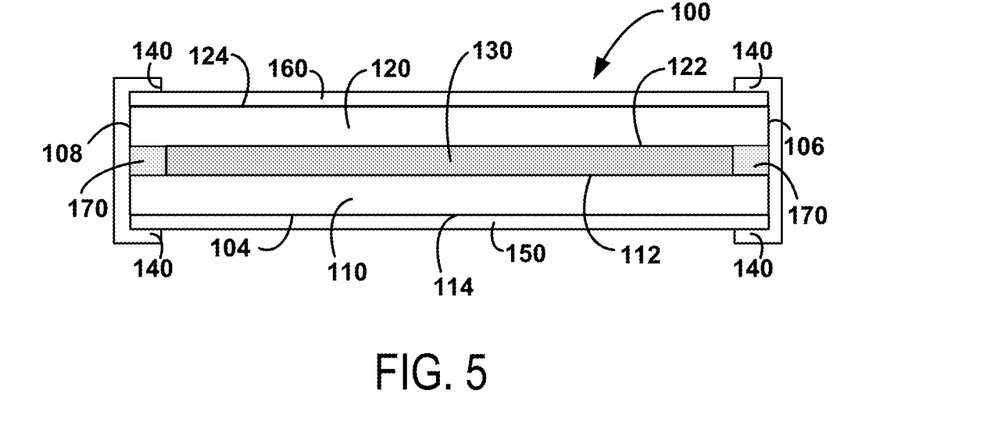
FIG. 5 is a schematic cross-section view of a plaster board according to another embodiment of the disclosure.
Figure 6:
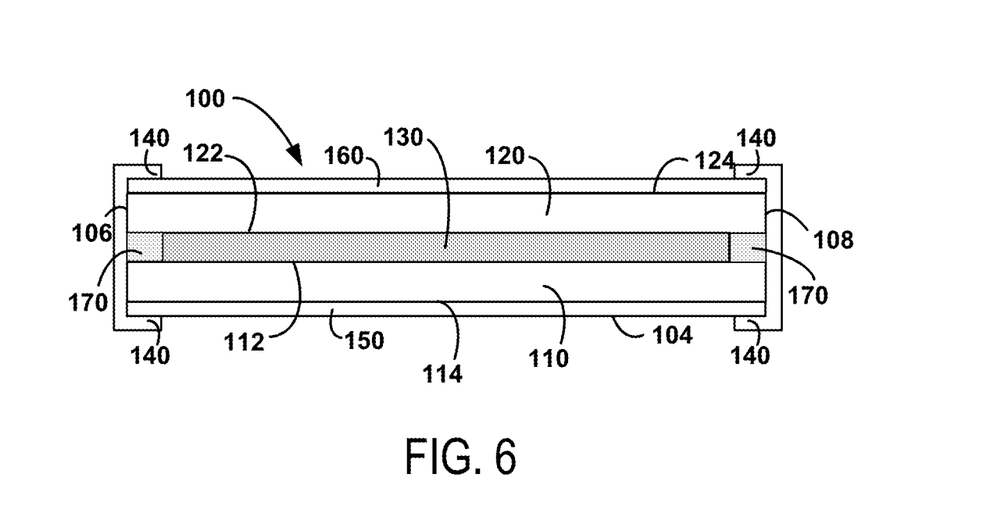
FIG. 6 is a schematic cross-section view of a plaster board according to another embodiment of the disclosure.

One embodiment of such a plaster board is described with respect to FIGS. 1-6 below. FIGS. 1-6 each show a different view of the plaster board 100. As shown in FIGS. 1 and 2, the plaster board 100 has a first edge 102 and an opposed second edge 104, and a third edge 106 and an opposed fourth edge 108. As shown in FIGS. 3-6, the plaster board 100 further includes a first layer of hardened plaster material 110 that includes a first surface 112 and an opposed second surface 114. The plaster board 100 also includes a second layer of hardened plaster material 120 that includes a first surface 122 and an opposed second surface 124. The second layer of hardened plaster material 120 is stacked against the first layer 110 such that the first surface 112 and the first surface 122 face one another. The first layer 110 and the second layer 120 together define the first edge 102, the second edge 104, the third edge 106, and the fourth edge 108 of the plaster board 100. The plaster board 100 further includes a viscoelastic polymer 130 disposed between the first surface 112 of the first layer of hardened plaster material 110 and the first surface 122 of the second layer of hardened plaster material 120. The viscoelastic polymer 130 does not extend substantially to any of the first edge 102, the second edge 104, third edge 106, or the fourth edge 108 of the plaster board 100. However, in other examples, the viscoelastic polymer may extend to one or more of the edges of the plaster board. As used herein, "extending substantially to" means "coming within one centimeter of."

As the person of ordinary skill in the art will appreciate, the hardened plaster material described herein may be made using a variety of different inorganic base materials. For example, in certain embodiments of the plaster boards and methods as otherwise described herein, the hardened plaster material comprises a base material that is a gypsum material. In other embodiments of the plaster boards and methods as otherwise described herein, the plaster material comprises a base material that is, for example, lime or cement.

A variety of viscoelastic polymers can be used in the plaster boards and methods of the disclosure. In various embodiments of the plaster boards and methods as described herein, the viscoelastic polymer is polyvinyl butyral, a silicone, or an acrylic. The viscoelastic polymer can be a thermally-cured material, e.g., a cured adhesive such as those available under the tradename Green Glue. Various viscoelastic glues made by Weber may also be suitable for use. Viscoelastic polymer compositions are also described in U.S. Pat. Nos. 8,028,800 and 9,157,241, each of which is hereby incorporated herein by reference in its entirety.

The plaster boards of the present disclosure may be made in a variety of thicknesses. The person of ordinary skill in the art will select a desirable thickness for a particular end use. In certain embodiments of the plaster boards and methods as otherwise described herein, the total thickness of the plaster board (i.e., between the liner 150 and the liner 160 of FIG. 3) is at least 0.25 inches and no more than 2 inches, e.g., in the range of 0.30 inches to 1.25 inch or in the range of 0.5 inch to 1 inch. In certain embodiments, the total thickness of the plaster board is substantially equal to 0.375 inches. In other particular embodiments, the total thickness of the plaster board is substantially equal to 0.5 inches. In still other particular embodiments, the total thickness of the plaster board is substantially equal to 0.625 inches. And in still other particular embodiments, the total thickness of the plaster board is substantially equal to one inch (e.g., especially when lower density plaster materials are used).

The person of ordinary skill in the art will appreciate, however, that the presently disclosed methods and boards can be of a variety of thicknesses and weights. For example, the board can be a lightweight board ⅝" in thickness with a weight on the order of 1400 lb/MSF (MSF=1,000 square feet), or can be a lightweight board 1" in thickness with a weight on the order of 2240 lb/MSF. Generally, boards can be made in any desirable weight, for example, from lightweight (1200 lb/MSF) to normal weight (2000 lb/MSF) to heavy weight (3000 lb/MSF), in any desirable thickness (e.g., ½", ⅝" or 1" thick). And as the person of ordinary skill in the art will appreciate, additional thin layers of plaster material (e.g., gypsum, usually of higher density than the bulk material) can be applied to the outsides of the paper or fiberglass layers cladding the plaster material core, in order to help improve mechanical strength.

As the person of ordinary skill in the art will appreciate, the plaster board 100 can be formed with any of the features described generally herein, e.g., the thicknesses as described above, and the materials as described above.

In some examples, the second surface of the second layer of hardened plaster material is tapered along one or more of the first, second, third and fourth edges of the plaster board.

The second surface may be tapered to accommodate the application of joint compound and/or joint tape during installation, for example.

Referring to FIGS. 3-6, the viscoelastic polymer 130 might not extend to within one inch, two inches, or three inches of one or more of the first edge 102, the second edge 104, the third edge 106, and the fourth edge 108 of the plaster board 100. For example, the viscoelastic polymer 130 may be bordered by the structural adhesive material 170 on one or more sides of the viscoelastic polymer 130, as discussed below.

As shown in FIGS. 1-6, the plaster board 100 also includes adhesive tape 140 disposed along the first edge 102, the second edge 104, the third edge 106, and the fourth edge 108 of the plaster board 100. In other embodiments, adhesive tape might be applied along zero, one, two, or three edges of the plaster board. The adhesive tape 140 helps bind the second surface 124 of the second layer of hardened plaster material 120 to the second surface 114 of the first layer of hardened plaster material 110 such that the adhesive tape 140 holds the first layer of hardened plaster 110 in place with respect to the second layer of hardened plaster material 120.

The plaster board 100 also includes a first liner 150 disposed on the second surface 114 of the first layer of hardened plaster material 110 and a second liner 160 disposed on the second surface 124 of the second layer of hardened plaster material 120. One or more of the first liner 150 or the second liner 160 may be made of paper and/or fiberglass. The adhesive tape 140 is adhered to the first liner 150 and to the second liner 160 along the first edge 102, the second edge 104, the third edge 106, and the fourth edge 108 of the plaster board 100. In other examples, the adhesive tape is adhered to one, two, or three of the edges of the plaster board or is not included as part of the plaster board at all.

The plaster board 100 also includes a structural adhesive material 170 disposed between the first surface 112 of the first layer of hardened plaster material 110 and the first surface 122 of the second layer of hardened plaster material 120 (e.g., at the perimeter of the plaster board). The structural adhesive material 170 is disposed along the first edge 102, the second edge 104, the third edge 106, and the fourth edge 108 of the plaster board 100. That is, the structural adhesive material 170 is disposed laterally between the viscoelastic polymer 130 and the first edge 102, between the viscoelastic polymer 130 the second edge 104, between the viscoelastic polymer 130 the third edge 106, and between the viscoelastic polymer 130 the fourth edge 108. In other examples, the structural adhesive material is disposed laterally between the viscoelastic polymer and one or more of (e.g., less than all of) the edges of the plaster board. The structural adhesive material 170 is a substantially less viscoelastic material than the viscoelastic polymer 130.

In some examples, the plaster board does not include the structural adhesive 170 and the viscoelastic polymer 130 might or might not extend to the respective first, second, third, and fourth edges of the plaster board.

As shown in FIGS. 3-6, the structural adhesive material 170 extends substantially to the first edge 102, the second edge 104, the third edge 106, and the fourth edge 108. In various examples, the structural adhesive material extends to one or more of (e.g., less than all of) the first, second, third, and fourth edges of the plaster board.

The structural adhesive material 170 contacts the viscoelastic polymer 130 along or near the first edge 102, the second edge 104, the third edge 106, and the fourth edge 108. In various embodiments, the structural adhesive material contacts the viscoelastic polymer along one or more of (e.g., less than all of) the first, second, third, and fourth edges of the plaster board.

The structural adhesive material 170 has an elastic modulus substantially greater than the elastic modulus of the viscoelastic polymer 130. As used herein, "substantially greater than" means "observably or quantifiably greater than."

In various examples, at least 50 percent, at least 75 percent, or at least 87.5 percent of the area of the first surface 112 of the first layer of hardened plaster material 110 and/or the first surface 122 of the second layer of hardened plaster material 120 is covered by the viscoelastic polymer 130.

In various embodiments, no more than 98 percent, no more than 95 percent, no more than 90 percent, or no more than 85 percent of the area of the first surface 112 of the first layer of hardened plaster material 110 and/or the first surface 122 of the second layer of hardened plaster material 120 is covered by the viscoelastic polymer 130.

The viscoelastic polymer 130 has an elastic modulus in the range of 10 kPa to 100 MPa, but other examples are possible.

Figure 7:
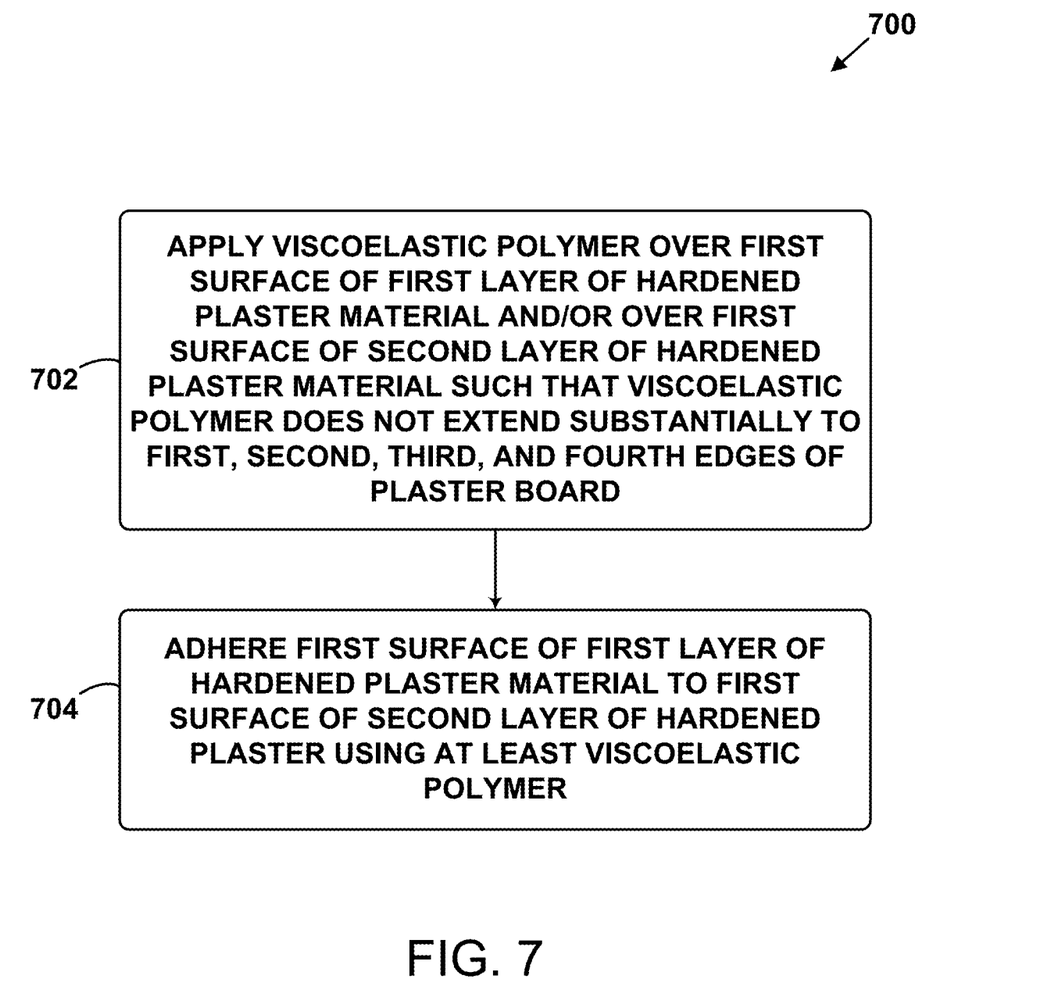
FIG. 7 is a block diagram of a method of forming a plaster board according to another embodiment of the disclosure.

FIG. 7 is a block diagram of a method 700 for forming plaster boards such as the plaster board 100.

At block 702, the method 700 includes applying the viscoelastic polymer over the first surface of the first layer of hardened plaster material and/or over the first surface of the second layer of hardened plaster material such that the viscoelastic polymer does not extend substantially to the first, second, third, and fourth edges of the plaster board. That is, the viscoelastic polymer might not extend to at least one edge of the plaster board.

For example, the viscoelastic polymer 130 may be applied as shown in FIGS. 3-6 over the first surface 112 of the first layer of hardened plaster material 110 and/or over the first surface 122 of the second layer of hardened plaster material 120 such that the viscoelastic polymer 130 does not extend substantially to the first edge 102, the second edge 104, the third edge 106, or the fourth edge 108. The viscoelastic polymer 130 may be applied to the first surface 112 and/or the first surface 122 prior to the first layer of hardened plaster material 110 being adhered to the second layer of hardened plaster material 120.

In various embodiments, the viscoelastic polymer 130 may be applied (e.g., via a dispenser) such that the viscoelastic polymer 130 does not extend to within one inch, two inches, or three inches of one, two, three, or all four of the first edge 102, the second edge 104, the third edge 106, and the fourth edge 108 of the plaster board 100.

At block 704, the method 700 includes adhering the first surface of the first layer of hardened plaster material to the first surface of the second layer of hardened plaster using at least the viscoelastic polymer.

For example, the first surface 112 of the first layer of hardened plaster material 110 may be adhered to the first surface 122 of the second layer of hardened plaster material 120 via the viscoelastic polymer 130 that is applied to the first surface 112 and/or the first surface 122. That is, the first layer of hardened plaster material 110 may be placed against the second layer of hardened plaster material 120 to (e.g., partially) encase the viscoelastic polymer 130 to allow the viscoelastic polymer 130 to cure and bond the first layer of hardened plaster material 110 to the second layer of hardened plaster material 120.

Additionally, an installer may adhere adhesive tape 140 along one or more of the first edge 102, the second edge 104, the third edge 106, and the fourth edge 108 of the plaster board 100. As shown in FIGS. 1-4, a first portion of the adhesive tape 140 may be wrapped around the first liner 150 and the second liner 160 along the first edge 102, and a second portion of the adhesive tape 140 may be wrapped around the first liner 150 and the second liner 160 along the second edge 104. As shown in FIGS. 1-2 and 5-6, a third portion of the adhesive tape 140 may be wrapped around the first liner 150 and the second liner 160 along the third edge 106, and a fourth portion of the adhesive tape 140 may be wrapped around the first liner 150 and the second liner 160 along the fourth edge 108. In other examples, the adhesive tape may be applied similarly to a plaster board that does not have liners.

The adhesive tape 140 helps bind the second surface 124 of the second layer of hardened plaster material 120 to the second surface 114 of the first layer of hardened plaster material 110 such that the adhesive tape 140 holds the first layer of hardened plaster 110 in place with respect to the second layer of hardened plaster material 120.

In some examples, the adhesive tape might only be adhered along two or more of, three or more of, or each of the first, second, third, and fourth edges of the plaster board.

Additionally, an installer may apply a structural adhesive material between the first surface of the first layer of hardened plaster material and the first surface of the second layer of hardened plaster material along one or more of the first, second, third, and fourth edges of the plaster board such that, after the viscoelastic polymer is applied, the structural adhesive material is laterally between the viscoelastic polymer and one or more of the first, second, third, and fourth edges. In this context, the structural adhesive material is a substantially stronger adhesive than the viscoelastic polymer.

For example, the structural adhesive material 170 may be applied between the first surface 112 of the first layer of hardened plaster material 110 and the first surface 122 of the second layer of hardened plaster material 120 along the first edge 102, the second edge 104, the third edge 106, and the fourth edge 108 such that, after the viscoelastic polymer 130 is applied, the structural adhesive material 170 is laterally between the viscoelastic polymer 130 and the first edge 102, laterally between the viscoelastic polymer 130 and the second edge 104, laterally between the viscoelastic polymer 130 and the third edge 106, and laterally between the viscoelastic polymer 130 and the fourth edge 108.

The structural adhesive material may be applied such that the structural adhesive material extends substantially to the one or more of the first, second, third, and fourth edges of the plaster board.

For example, the structural adhesive material 170 may be applied such that the structural adhesive material 170 extends substantially to the first edge 102, the second edge 104, the third edge 106, and the fourth edge 108 of the plaster board 100. The structural adhesive material 170 may be applied such that, after the viscoelastic polymer 130 is applied, the structural adhesive material 170 contacts the viscoelastic polymer 130 along the first edge 102, the second edge 104, the third edge 106, and the fourth edge 108.

In some examples, the structural adhesive 170 is not applied to the plaster board at all and the viscoelastic polymer 130 might or might not extend to the respective first, second, third, and fourth edges of the plaster board.

The viscoelastic polymer 130 may be applied such that at least 50 percent, at least 75 percent, or at least 87.5 percent of the area of the first surface 112 of the first layer of hardened plaster material or the first surface 122 of the second layer of hardened plaster material 120 is covered by the viscoelastic polymer 130.

The viscoelastic polymer 130 may be applied such that no more than 98 percent, no more than 95 percent, no more than 90 percent, or no more than 85 percent of the area of the first surface 112 of the first layer of hardened plaster material 110 or the second surface 122 of the second layer of hardened plaster material 120 is covered by the viscoelastic polymer 130.

Figure 8:
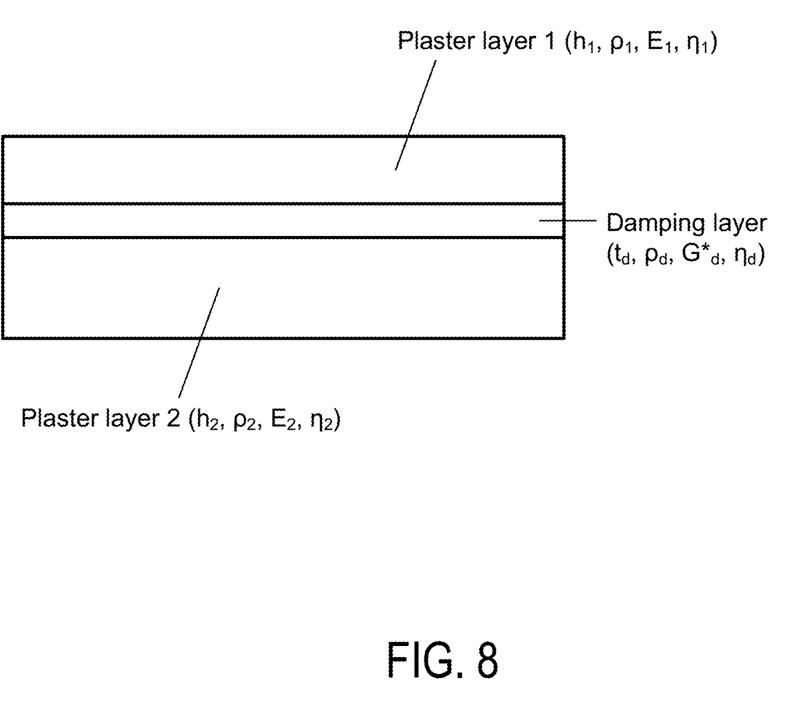
FIG. 8 is a schematic cross-sectional view of a model of a plaster board useful in modelling of constrained layer damping.

As described above, the person of ordinary skill in the art can select various material properties to provide, for example, a desired level of damping. In certain embodiments, the plaster boards described herein can be modeled using principles of constrained layer damping, assuming a viscoelastic damping layer (having a thickness t, a density $\rho$, a shear modulus $G^*$ and a damping loss factor $\eta$) constrained between two layers of plaster (which need not identical in properties, each having a thickness h, a density p, a Young's modulus E, and a damping loss factor $\eta$). Such a plaster board model is shown in schematic cross-sectional view in FIG. 8. The intermediate damping layer can have much lower rigidity compared to the plaster layers on either side thereof, with a low shear modulus ($G^*$) and high damping loss factor ($\eta$). The damping layer can provide shear deformation when the plaster board undergoes flexural vibration, effectively reducing the rigidity of the structure and providing shear damping, which can lead to improved performance in the so-called "coincidence frequency" range between 2~4 kHz.

The design principles for such a structure is described by the RKU model, described in D. Ross, E. E. Ungar and E. M. Kerwin, "Damping of plate flexural vibrations by means of viscoelastic laminate" Structural Damping, Section II ASME, 1959, which is hereby incorporated herein by reference in its entirety. U.S. Pat. No. 7,745,005, which is hereby incorporated herein by reference in its entirety, also describes the laminated gypsum structure with different patterns of damping layers.

The disclosure also provides the following numbered embodiments, which can be combined in any logically and technically consistent fashion.

Embodiment 1

A plaster board having a first edge and an opposed second edge, and a third edge and an opposed fourth edge, the plaster board comprising:
 a first layer of hardened plaster material comprising a first surface and an opposed second surface;
 a second layer of hardened plaster material comprising a first surface and an opposed second surface, the second layer of hardened plaster material being stacked against the first layer such that their first surfaces face one another, the first layer and the second layer together defining the first, second, third, and fourth edges of the plaster board; and
 a viscoelastic polymer disposed between the first surface of the first layer of hardened plaster material and the first surface of the second layer of hardened plaster material, the viscoelastic polymer not extending substantially to the first, second, third, and fourth edges of the plaster board.

Embodiment 2

The plaster board of embodiment 1, wherein the second surface of the second layer of hardened plaster material is tapered along one or more of the first, second, third and fourth edges of the plaster board.

Embodiment 3

The plaster board of embodiment 1 or embodiment 2, wherein the viscoelastic polymer does not extend to within one inch (e.g., within two inches, or within three inches) of one or more of the first, second, third, and fourth edges of the plaster board.

Embodiment 4

The plaster board of embodiment 1 or embodiment 2, wherein the viscoelastic polymer does not extend to within one one inch (e.g., within two inches, or within three inches) of two or more of the first, second, third, and fourth edges of the plaster board.

Embodiment 5

The plaster board of embodiment 1 or embodiment 2, wherein the viscoelastic polymer does not extend to within one inch (e.g., within two inches, or within three inches) of the third edge of the plaster board, and does not extend to within one inch (e.g., within two inches, or within three inches) of the fourth edge of the plaster board Embodiment 6

The plaster board of embodiment 1 or embodiment 2, wherein the viscoelastic polymer does not extend to within one inch (e.g., within two inches, or within three inches) of three or more of the first, second, third, and fourth edges of the plaster board.

Embodiment 7

The plaster board of embodiment 1 or embodiment 2, wherein the viscoelastic polymer does not extend to within one inch (e.g., within two inches, or within three inches) of each of the first, second, third, and fourth edges of the plaster board.

Embodiment 8

The plaster board of any of embodiments 1-7, further comprising adhesive tape disposed along one or more of the first, second, third, and fourth edges of the plaster board, the adhesive tape binding the second surface of the second layer of hardened plaster material to the second surface of the first layer of hardened plaster material such that the adhesive tape holds the first layer of hardened plaster in place with respect to the second layer of hardened plaster material.

Embodiment 9

The plaster board of embodiment 8, wherein the adhesive tape is disposed along two or more of the first, second, third, and fourth edges of the plaster board.

Embodiment 10

The plaster board of embodiment 9, wherein the adhesive tape is disposed along the first edge and the second edge of the plaster board.

Embodiment 11

The plaster board of embodiment 8, wherein the adhesive tape is disposed along three or more of the first, second, third, and fourth edges of the plaster board.

Embodiment 12

The plaster board of embodiment 8, wherein the adhesive tape is disposed along each of the first, second, third, and fourth edges of the plaster board.

Embodiment 13

The plaster board of any of embodiments 8-12, further comprising:
 a first liner disposed on the second surface of the first layer of hardened plaster material; and
 a second liner disposed on the second surface of the second layer of hardened plaster material,
 wherein the adhesive tape is adhered to the first liner and to the second liner along the one or more of the first, second, third, and fourth edges of the plaster board.

Embodiment 14

The plaster board of any of embodiments 8-13, wherein the adhesive tape provides the edge of the board with the appearance of one continuous layer.

Embodiment 15

The plaster board of any of embodiments 1-14, further comprising:
 a structural adhesive material disposed between the first surface of the first layer of hardened plaster material and the first surface of the second layer of hardened plaster material, along one or more of the first, second, third, and fourth edges of the plaster board, laterally between the viscoelastic polymer and the one or more of the first, second, third, and fourth edges, the structural adhesive material being a substantially less viscoelastic material than the viscoelastic polymer.

Embodiment 16

The plaster board of embodiment 15, wherein the structural adhesive material is disposed along the third edge and the fourth edge of the plaster board, laterally between the viscoelastic polymer and the third edge, and laterally between the viscoelastic polymer and the fourth edge.

Embodiment 17

The plaster board of embodiment 15, wherein the structural adhesive material is disposed along the first edge and the second edge of the plaster board, laterally between the viscoelastic polymer and the first edge, and laterally between the viscoelastic polymer and the second edge.

Embodiment 18

The plaster board of any of embodiments 15-17, wherein the structural adhesive material extends substantially to the one or more of the first, second, third, and fourth edges of the plaster board.

Embodiment 19

The plaster board of any of embodiments 15-18, wherein the structural adhesive material contacts the viscoelastic polymer along the one or more of the first, second, third, and fourth edges of the plaster board.

Embodiment 20

The plaster board of any of embodiments 15-19, wherein the structural adhesive is a substantially stronger adhesive than the viscoelastic polymer.

Embodiment 21

The plaster board of any of embodiments 15-20, wherein the structural adhesive has a shear modulus that is at least 10 MPa (e.g., at least 50 MPa, or even at least 100 MPa) greater than the shear modulus of the viscoelastic polymer.

Embodiment 22

The plaster board of any of embodiments 15-21, wherein the structural adhesive has a shear modulus of at least 10 MPa (e.g., at least 100 MPa, or even at least 500 MPa).

Embodiment 23

The plaster board of any of embodiments 1-22, wherein at least 50 percent (e.g., at least 75 percent, or at least 87.5 percent) of the area of the first surfaces of the first layer of hardened plaster material or the second layer of hardened plaster material is covered by the viscoelastic polymer.

Embodiment 24

The plaster board of any of embodiments 1-23, wherein no more than 98 percent, no more than 95 percent (e.g., no more than 90 percent, or no more than 85 percent) of the area of the first surfaces of the first layer of hardened plaster material or the second layer of hardened plaster material is covered by the viscoelastic polymer.

Embodiment 25

The plaster board of any of embodiments 1-24, wherein the viscoelastic polymer has an elastic modulus in the range of 10 kPa to 100 MPa.

Embodiment 26

A method of forming any of the plaster boards of embodiments 1-25, the method comprising:
  applying the viscoelastic polymer over the first surface of the first layer of hardened plaster material and/or over the first surface of the second layer of hardened plaster material such that the viscoelastic polymer does not extend substantially to the first, second, third, and fourth edges of the plaster board; and
  adhering the first surface of the first layer of hardened plaster material to the first surface of the second layer of hardened plaster using at least the viscoelastic polymer.

Embodiment 27

The method of embodiment 26, wherein applying the viscoelastic polymer comprises applying the viscoelastic polymer such that the viscoelastic polymer does not extend to within one inch (e.g., within two inches, or within three inches) of one or more of the first, second, third, and fourth edges of the plaster board.

Embodiment 28

The method of embodiment 26 or embodiment 27, wherein applying the viscoelastic polymer comprises applying the viscoelastic polymer such that the viscoelastic polymer does not extend to within one inch (e.g., within two inches, or within three inches) of two or more of the first, second, third, and fourth edges of the plaster board.

Embodiment 29

The method of embodiment 26 or embodiment 27, wherein applying the viscoelastic polymer comprises applying the viscoelastic polymer such that the viscoelastic polymer does not extend to within one inch (e.g., within two inches, or within three inches) of the third edge of the plaster board, and does not extend to within one inch (e.g., within two inches, or within three inches) of the fourth edge of the plaster board.

Embodiment 30

The method of embodiment 26 or embodiment 27, wherein applying the viscoelastic polymer comprises applying the viscoelastic polymer such that the viscoelastic polymer does not extend to within one inch (e.g., within two inches, or within three inches) of three or more of the first, second, third, and fourth edges of the plaster board.

Embodiment 31

The method of embodiment 26 or embodiment 27, wherein applying the viscoelastic polymer comprises applying the viscoelastic polymer such that the viscoelastic polymer does not extend to within one inch (e.g., within two inches, or within three inches) of each of the first, second, third, and fourth edges of the plaster board.

Embodiment 32

The method of any of embodiments 26-31, further comprising
  adhering adhesive tape along one or more of the first, second, third, and fourth edges of the plaster board, the adhesive tape binding the second surface of the second layer of hardened plaster material to the second surface of the first layer of hardened plaster material such that the adhesive tape holds the first layer of hardened plaster in place with respect to the second layer of hardened plaster material.

Embodiment 33

The method of embodiment 32, wherein adhering the adhesive tape comprises adhering the adhesive tape along two or more of the first, second, third, and fourth edges of the plaster board.

Embodiment 34

The method of embodiment 33, wherein adhering the adhesive tape comprises adhering the adhesive tape along the first edge and the second edge of the plaster board.

Embodiment 35

The method of embodiment 32, wherein adhering the adhesive tape comprises adhering the adhesive tape along three or more of the first, second, third, and fourth edges of the plaster board.

Embodiment 36

The method of embodiment 32, wherein adhering the adhesive tape comprises adhering the adhesive tape along each of the first, second, third, and fourth edges of the plaster board.

Embodiment 37

The method of any of embodiments 32-36,
wherein the plaster board comprises a first liner disposed on the second surface of the first layer of hardened plaster material and a second liner disposed on the second surface of the second layer of hardened plaster material,
wherein adhering the adhesive tape comprises adhering the adhesive tape to the first liner and to the second liner along the one or more of the first, second, third, and fourth edges of the plaster board.

Embodiment 38

The method of any of embodiments 26-37, further comprising:
applying a structural adhesive material between the first surface of the first layer of hardened plaster material and the first surface of the second layer of hardened plaster material along one or more of the first, second, third, and fourth edges of the plaster board such that, after the viscoelastic polymer is applied, the structural adhesive material is laterally between the viscoelastic polymer and the one or more of the first, second, third, and fourth edges, the structural adhesive material being a substantially less viscoelastic material than the viscoelastic polymer.

Embodiment 39

The method of embodiment 38, wherein applying the structural adhesive material comprises applying the structural adhesive material along the third edge and the fourth edge of the plaster board such that, after the viscoelastic polymer is applied, the structural adhesive material is laterally between the viscoelastic polymer and the third edge, and laterally between the viscoelastic polymer and the fourth edge.

Embodiment 40

The method of embodiment 38, wherein applying the structural adhesive material comprises applying the structural adhesive material along the first edge and the second edge of the plaster board such that, after the viscoelastic polymer is applied, the structural adhesive material is laterally between the viscoelastic polymer and the first edge, and laterally between the viscoelastic polymer and the second edge.

Embodiment 41

The method of any of embodiments 38-40, wherein applying the structural adhesive material comprises applying the structural adhesive material such that the structural adhesive material extends substantially to the one or more of the first, second, third, and fourth edges of the plaster board.

Embodiment 42

The method of any of embodiments 38-41, wherein applying the structural adhesive material comprises applying the structural adhesive material such that, after the viscoelastic polymer is applied, the structural adhesive material contacts the viscoelastic polymer along the one or more of the first, second, third, and fourth edges of the plaster board.

Embodiment 43

The method of any of embodiments 38-42, wherein the structural adhesive material is a substantially stronger adhesive than the viscoelastic polymer.

Embodiment 44

The plaster board of any of embodiments 38-43, wherein the structural adhesive has a shear modulus that is at least 10 MPa (e.g., at least 50 MPa, or even at least 100 MPa) greater than the shear modulus of the viscoelastic polymer.

Embodiment 45

The plaster board of any of embodiments 38-44, wherein the structural adhesive has a shear modulus of at least 10 MPa (e.g., at least 50 MPa, or even at least 100 MPa).

Embodiment 46

The method of any of embodiments 26-45, wherein applying the viscoelastic polymer comprises applying the viscoelastic polymer such that at least 50 percent (e.g., at least 75 percent, or at least 87.5 percent) of the area of the first surfaces of the first layer of hardened plaster material or the second layer of hardened plaster material is covered by the viscoelastic polymer.

Embodiment 47

The method of any of embodiments 26-46, wherein applying the viscoelastic polymer comprises applying the viscoelastic polymer such that no more than 98 percent (e.g., no more than 95 percent, no more than 90 percent, or no more than 85 percent) of the area of the first surfaces of the first layer of hardened plaster material or the second layer of hardened plaster material is covered by the viscoelastic polymer.

Embodiment 48

The method of any of embodiments 26-47, wherein the viscoelastic polymer has an elastic modulus in the range of 10 kPa to 100 MPa.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A plaster board having a first edge and an opposed second edge, and a third edge and an opposed fourth edge, the plaster board comprising:
   a first layer of hardened plaster material comprising a first surface and an opposed second surface;
   a second layer of hardened plaster material comprising a first surface and an opposed second surface, the second layer of hardened plaster material being stacked against the first layer such that their first surfaces face one another, the first layer and the second layer together defining the first, second, third, and fourth edges of the plaster board;
   a viscoelastic polymer disposed between the first surface of the first layer of hardened plaster material and the first surface of the second layer of hardened plaster material, the viscoelastic polymer not extending to within one inch of each of the first, second, third, and fourth edges of the plaster board; and
   adhesive tape disposed along one or more of the first, second, third, and fourth edges of the plaster board, the adhesive tape binding the second surface of the second layer of hardened plaster material to the second surface of the first layer of hardened plaster material such that the adhesive tape holds the first layer of hardened plaster in place with respect to the second layer of hardened plaster material, wherein the plaster board lacks a separate structural adhesive coupling the first surface of the first layer of hardened plaster material and the first surface of the second layer of hardened plaster material.

2. The plaster board of claim 1, wherein the second surface of the second layer of hardened plaster material is tapered along one or more of the first, second, third and fourth edges of the plaster board.

3. The plaster board of claim 1, wherein the viscoelastic polymer does not extend to within two inches of each of the first, second, third, and fourth edges of the plaster board.

4. The plaster board of claim 1, further comprising:
   a first liner disposed on the second surface of the first layer of hardened plaster material; and
   a second liner disposed on the second surface of the second layer of hardened plaster material,
   wherein the adhesive tape is adhered to the first liner and to the second liner along the one or more of the first, second, third, and fourth edges of the plaster board.

5. The plaster board of claim 1, wherein at least 50 percent of the area of the first surfaces of the first layer of hardened plaster material or the second layer of hardened plaster material is covered by the viscoelastic polymer.

6. The plaster board of claim 1, wherein no more than 98 percent of the area of the first surfaces of the first layer of hardened plaster material or the second layer of hardened plaster material is covered by the viscoelastic polymer.

7. The plaster board of claim 1, wherein the viscoelastic polymer has an elastic modulus in the range of 10 kPa to 100 MPa.

8. The plaster board of claim 1, wherein the adhesive tape is disposed along each of the first, second, third, and fourth edges of the plaster board.

9. A method of forming any of the plaster boards of claim 1, the method comprising:
   applying the viscoelastic polymer over the first surface of the first layer of hardened plaster material and/or over the first surface of the second layer of hardened plaster material such that the viscoelastic polymer does not extend substantially to the first, second, third, and fourth edges of the plaster board; and
   adhering the first surface of the first layer of hardened plaster material to the first surface of the second layer of hardened plaster using at least the viscoelastic polymer.

10. The method of claim 9, further comprising:
    applying adhesive tape disposed along one or more of the first, second, third, and fourth edges of the plaster board, the adhesive tape binding the second surface of the second layer of hardened plaster material to the second surface of the first layer of hardened plaster material such that the adhesive tape holds the first layer of hardened plaster in place with respect to the second layer of hardened plaster material.

* * * * *